UNITED STATES PATENT OFFICE.

JOHN A. HEANY, OF PHILADELPHIA, PENNSYLVANIA, ASSIGNOR TO THE TETER-HEANY DEVELOPING COMPANY, OF CHARLESTON, WEST VIRGINIA, AND PHILADELPHIA, PENNSYLVANIA, A CORPORATION OF WEST VIRGINIA.

INSULATING METALLIC SURFACES OR WIRES.

SPECIFICATION forming part of Letters Patent No. 715,798, dated December 16, 1902.

Application filed April 10, 1902. Serial No. 102,237. (No model.)

*To all whom it may concern:*

Be it known that I, JOHN A. HEANY, a citizen of the United States, residing at the city of Philadelphia, in the county of Philadelphia and State of Pennsylvania, have invented certain new and useful Improvements in Insulating Metallic Surfaces or Wires, of which the following is a specification.

My invention has relation to the insulation of metallic surfaces and electric wires.

The principal objects of my invention are, first, to provide an insulation or covering for electric wires or metallic surfaces which shall be fireproof, waterproof, and in a marked degree acid proof, and also sufficiently pliable and adhesive to permit, preferably, of the wire or metallic surface being transformed into helices or coils without injuriously affecting or impairing the insulating covering of the metallic surface or wire; second, to provide an insulator or insulating compound adapted principally for employment for covering electric wires, although susceptible of use for other purposes where insulation is requisite and in various forms—such as in sheets, boards, paper tubes, or the like, and, third, to provide by reason of its composition an insulating compound, or what can be properly termed an "albumen aluminated borate of lime amalgam" for various purposes in the art.

My invention will be more fully understood from the following description; but I do not wish to be understood as limiting myself to the precise chemicals to be mentioned nor to the proportions of such to be stated, as the merit as well as scope of my said invention consists, essentially, in combining chemicals of the character to be recited possessing the properties and qualities necessary for chemical union for employment, among other uses, for insulating metallic surfaces and electric wires.

The base of the compound is asbestos, and the other elements or ingredients of the same are classified as follows: 1, alumina products, such as sulfate of alumina, oxid of alumina, &c.; 2, lime products or compounds containing lime, such as anhydrated, hydrated, sulfates, &c.; 3, borate products, such as boric acid, borate manganese, borate sodium, &c.; 4, cohesive material, such as animal and vegetable albumens, gluey and gummy materials.

Classes 1, 2, and 3, recited above, when combined constitute the amalgam.

The preparation of such an insulating compound is effected by combining an alumina product, lime product, and borate product with a gluey or adhesive material and asbestos as the base.

For the insulation of wires or metallic surfaces it has been found that the best method is to cover the wire with the asbestos and to then apply the albumen aluminated borate of lime amalgam composition thereto.

The proportions and best results of such product in application in practice have been found to be as follows: lime, two ounces; oxid of alumina, six drams, and kaolin six drams, with boracic acid one-half ounce, and sulfate of alumina four ounces in solution. As to the solution of the glues to be added the quantity will depend upon the use or purpose of the mixture with the quantity of asbestos used.

Having thus described the nature and objects of my invention, what I claim as new, and desire to secure by Letters Patent, is—

1. A product, as an insulating compound, consisting of asbestos combined with an albumen aluminated borate of lime amalgam, substantially as and for the purposes described.

2. A product, as an insulating compound, consisting of asbestos combined with an albumen aluminated borate lime amalgam and a cohesive material, substantially as and for the purposes described.

3. A product, as an insulating compound, consisting of asbestos combined with a borate of lime product and an adhesive substance, substantially as and for the purposes described.

4. A product, as an insulating compound, consisting of asbestos combined with adhesive or gluey material, lime product and borate product, substantially as and for the purposes described.

5. A product, as an insulating compound, consisting of asbestos, an adhesive and an aluminated borate of lime product, substantially as and for the purposes described.

6. A product, as an insulating compound, consisting of asbestos, an adhesive gluey substance, lime or lime compounds, borate product and an alumina product, substantially as and for the purposes described.

In testimony whereof I have hereunto set my signature in the presence of two subscribing witnesses.

JOHN A. HEANY.

Witnesses:
J. WALTER DOUGLASS,
THOMAS M. SMITH.